US007821552B2

(12) United States Patent
Suzuki (10) Patent No.: US 7,821,552 B2
(45) Date of Patent: Oct. 26, 2010

(54) IMAGING APPARATUS PROVIDED WITH IMAGING DEVICE HAVING SENSITIVITY IN VISIBLE AND INFRARED REGIONS

(75) Inventor: Kazuhiro Suzuki, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 792 days.

(21) Appl. No.: 11/643,697

(22) Filed: Dec. 22, 2006

(65) Prior Publication Data
US 2007/0146512 A1   Jun. 28, 2007

(30) Foreign Application Priority Data

| Dec. 27, 2005 | (JP) | ............................. 2005-375519 |
| Dec. 27, 2005 | (JP) | ............................. 2005-375520 |
| Nov. 6, 2006 | (JP) | ............................. 2006-300694 |
| Nov. 6, 2006 | (JP) | ............................. 2006-300695 |

(51) Int. Cl.
*H04N 9/04* (2006.01)
(52) U.S. Cl. .................. 348/272; 348/167; 348/273; 348/276
(58) Field of Classification Search ............... None
See application file for complete search history.

(56) References Cited

U.S. PATENT DOCUMENTS

2003/0112353 A1   6/2003   Morris
2005/0133690 A1*  6/2005   Higashitsutsumi ....... 250/208.1

FOREIGN PATENT DOCUMENTS

| JP | 6-105319 A | 4/1994 |
| JP | 2005-323141 | 11/2005 |
| JP | 2005-341470 | 12/2005 |

OTHER PUBLICATIONS

Chinese Office Action, with English Translation, issued Chinese Patent Application No. CN 200610171151.9, dated January 23, 2009.
Japanese Notification of Reasons for Refusal, with English Translation, issued in Japanese Patent Application No. JP 2006-300694, dated Apr. 28, 2009.
Japanese Decision of Refusal, w/ English translation thereof, issued in Japanese Patent Application No. JP 2006-300694 dated Jan. 5, 2010.

* cited by examiner

*Primary Examiner*—David L Ometz
*Assistant Examiner*—Angel L Garces-Rivera
(74) *Attorney, Agent, or Firm*—McDermott Will & Emery LLP (57) ABSTRACT

An imaging apparatus includes: a first pixel which receives both visible light and infrared light, and a second pixel which receives infrared light, both pixels being formed on an imaging device; an infrared light component estimation unit which estimates, based on spectral characteristics of light received by the first pixel and spectral characteristics of light received by the second pixel, a magnitude of an infrared light component contained in a signal outputted from the first pixel from a signal outputted from the second pixel; and a subtraction unit which subtracts the estimated infrared light component from the signal outputted from the first pixel.

10 Claims, 8 Drawing Sheets

IMAGING APPARATUS PROVIDED WITH IMAGING DEVICE HAVING SENSITIVITY IN VISIBLE AND INFRARED REGIONS

BACKGROUND OF THE INVENTION

1. Field of the Invention

The present invention relates to an imaging apparatus provided with an imaging device having sensitivity in visible and infrared regions.

2. Description of the Related Art

In general, imaging devices such as charge coupled devices (CCDs) and complementally metal oxide semiconductor sensors (CMOS sensors) exhibit sensitivity not only to visible light but also to infrared light. When an image is taken using such imaging devices in a dark environment, a high-sensitivity monochrome image can be obtained by utilizing the infrared light component to obtain a luminance component. On the other hand, in order to obtain a color image having good color reproducibility, the infrared light component must be removed.

In Japanese Patent Laid-Open Publication No. Hei 6-105319, a method using an imaging device and an infrared light receiving device is disclosed in which the output signal of the infrared light receiving device (i.e., an infrared component) is subtracted from the output signal of the imaging device (i.e., the sum of a visible light component and the infrared light component).

In order to obtain a color image having good color reproducibility using the imaging device described above, the infrared light component must be removed. Furthermore, when an image is taken in a dark environment, it is desirable to achieve a high-sensitivity monochrome image by incorporating the infrared light component to obtain a luminance component.

In Japanese Patent Laid-Open Publication No. Hei 6-105319, a method using an imaging device and an infrared light receiving device is disclosed in which a luminous component is extracted from an output signal containing an infrared light component. Specifically, the output signal of the infrared light receiving device (i.e., the infrared light component) is subtracted from the output signal of the imaging device (i.e., the sum of visible light and infrared light components). When the subtraction result is less than a certain threshold value, the output signal from the solid imaging device is subjected to color suppression rather than subtraction processing, and as such the luminous component is extracted from the output signal containing the infrared light component. In this manner, a color image having good color reproducibility can be obtained when the image is taken in a bright environment, and a high-sensitivity monochrome image can be taken in a dark environment.

However, in the method disclosed in Japanese Patent Laid-Open Publication No. Hei 6-105319, when the spectral characteristics of a visible light filter provided in the imaging device and of an infrared light filter provided in the infrared light receiving device are different in the infrared region, the infrared light component cannot be satisfactorily removed from the output signal of the imaging device. Hence, a problem exists in that good color reproducibility cannot be obtained.

Furthermore, in the method disclosed in Japanese Patent Laid-Open Publication No. Hei 6-105319, switching between a color image and a monochrome image is done instantaneously. Hence, a problem exists in that the person taking the image has an uncomfortable feeling.

SUMMARY OF THE INVENTION

The present invention has been developed in view of the foregoing circumstances. A general purpose of the invention is to provide an imaging apparatus capable of acquiring a color image having good color reproducibility. Another general purpose of the invention is to provide an imaging apparatus capable of smoothly switching between a color image having good color reproducibility and a high-sensitivity monochrome image.

One embodiment of the present invention relates to an imaging apparatus. This apparatus includes: a first pixel which receives both visible light and infrared light; a second pixel which receives infrared light; an estimation unit which estimates, based on spectral characteristics of light received by the first pixel and spectral characteristics of light received by the second pixel, a magnitude of an infrared light component contained in a signal outputted from the first pixel from a signal outputted from the second pixel; and a subtraction unit which subtracts the estimated infrared light component from the signal outputted from the first pixel.

The spectral characteristics of the light received by the first pixel which receives both visible light and infrared light may be different from the spectral characteristics of the light received by the second pixel which receives infrared light only. In such a case, according to this embodiment, the infrared light component contained in the signal outputted from the first pixel can be estimated relatively accurately, based on the spectral characteristics of the light received by the first pixel and of the light received by the second pixel, from the signal outputted from the second pixel. Therefore, the infrared light component can be satisfactorily removed from the signal outputted from the first pixel. Hence, a color image having good color reproducibility can be obtained using this imaging apparatus.

In this instance, the spectral characteristics of the light received by each of the first and second pixels may be determined by, for example, the spectral characteristics of a color filter provided in each of the first and second pixels or the spectral characteristics of a photoelectric conversion device provided in each of the first and second pixels. In this manner, even when the spectral characteristics of the color filter or the spectral characteristics of the photoelectric conversion device are different between the first pixel and the second pixel, the infrared light component contained in the signal outputted from the first pixel can be estimated relatively accurately.

Furthermore, the spectral characteristics of the light received by each of the first and second pixels may be determined by the spectral characteristics of the light incident on each of the first and second pixels. In this manner, even when a light source or a subject is changed, the infrared light component contained in the signal outputted from the first pixel can be estimated relatively accurately.

In this embodiment, the first pixel and the second pixel may be formed on an identical imaging device. Hence, it is sufficient to provide one imaging device, and an optical device for extracting the infrared light component is not required. Thus, the size of the imaging apparatus can be reduced.

Another embodiment of the present invention also relates to an imaging apparatus. This apparatus includes: a first pixel which receives both visible light and infrared light; a second pixel which receives infrared light; a subtraction unit which subtracts from a signal outputted from the first pixel a signal obtained by multiplying a signal outputted from the second pixel by a coefficient; and a determination unit which determines, based on a ratio of a magnitude of the signal outputted from the second pixel to a magnitude of the signal outputted from the first pixel, the coefficient to be multiplied by the signal outputted from the second pixel in the subtraction unit.

In this embodiment, when the infrared light component is removed from the signal containing the visible and infrared light components, the subtraction ratio of the infrared light component is determined based on the ratio of the magnitude of the infrared light component to the magnitude of the signal containing the visible and infrared light components. For example, when the ratio of the infrared light component is sufficiently small, the infrared light component is subtracted as is. As the ratio of the infrared light component increases, the subtraction ratio of the infrared light component is gradually decreased. Furthermore, when the ratio of the infrared light component is sufficiently large, the infrared light component is not subtracted at all.

In this manner, when the ratio of the infrared light component is sufficiently small, the infrared light component can be reliably removed, and thus a color image having good color reproducibility can be obtained. Furthermore, when the ratio of the infrared light component is sufficiently large, a high-sensitivity monochrome image can be obtained by utilizing the infrared light component contained in the signal from each pixel. In addition to this, since the subtraction ratio of the infrared light component is gradually changed according to the ratio of the infrared light component, switching between a color image and a monochrome image can be performed smoothly.

In this embodiment, the determination unit may determine, based on the illuminance when an image is taken, the coefficient to be multiplied by the signal outputted from the second pixel. In this manner, when an image is taken in a bright environment and even when the ratio of the infrared light component is large, a color image having good color reproducibility can be obtained by determining the coefficient such that a large portion of the infrared light component is removed.

Moreover, in this embodiment, the subtraction unit may separately subtracts the signals obtained by multiplying the signal outputted from the second pixel by the coefficient for a luminance component and by the coefficient for a color component, from the signal outputted from the first pixel. Hence, as for the luminance component, the infrared light component passing through a visible light filter can be effectively utilized by setting the coefficient to be a small value, and as such the sensitivity can be increased. As for the color component, the infrared light component can be removed as much as possible by setting the coefficient to be a large value, and as such good color reproducibility can be achieved.

Furthermore, in this embodiment, the determination unit may determine another coefficient for correcting the difference between the spectral characteristics of the first pixel and the spectral characteristics of the second pixel. In addition to this, the subtraction unit may subtract from the signal outputted from the first pixel a signal obtained by further multiplying the signal outputted from the second pixel by the another coefficient. In this manner, even when the spectral characteristics are different between the first pixel and the second pixel, the infrared light component contained in the signal outputted from the first pixel can be correctly estimated, and as such the color reproducibility can be further improved.

Moreover, in this embodiment, the first pixel and the second pixel may be formed on an identical imaging device. Hence, it is sufficient to provide one imaging device, and an optical device for extracting the infrared light component is not required. Thus, the size of the imaging apparatus can be reduced.

It is to be noted that any arbitrary combination of the above-described components, and the components and expressions of the invention mutually replaced with their methods, apparatus, systems, and so forth are also considered to be effective as embodiments of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

Hereinafter, the best modes for carrying out the invention will be described.

Figure 1:
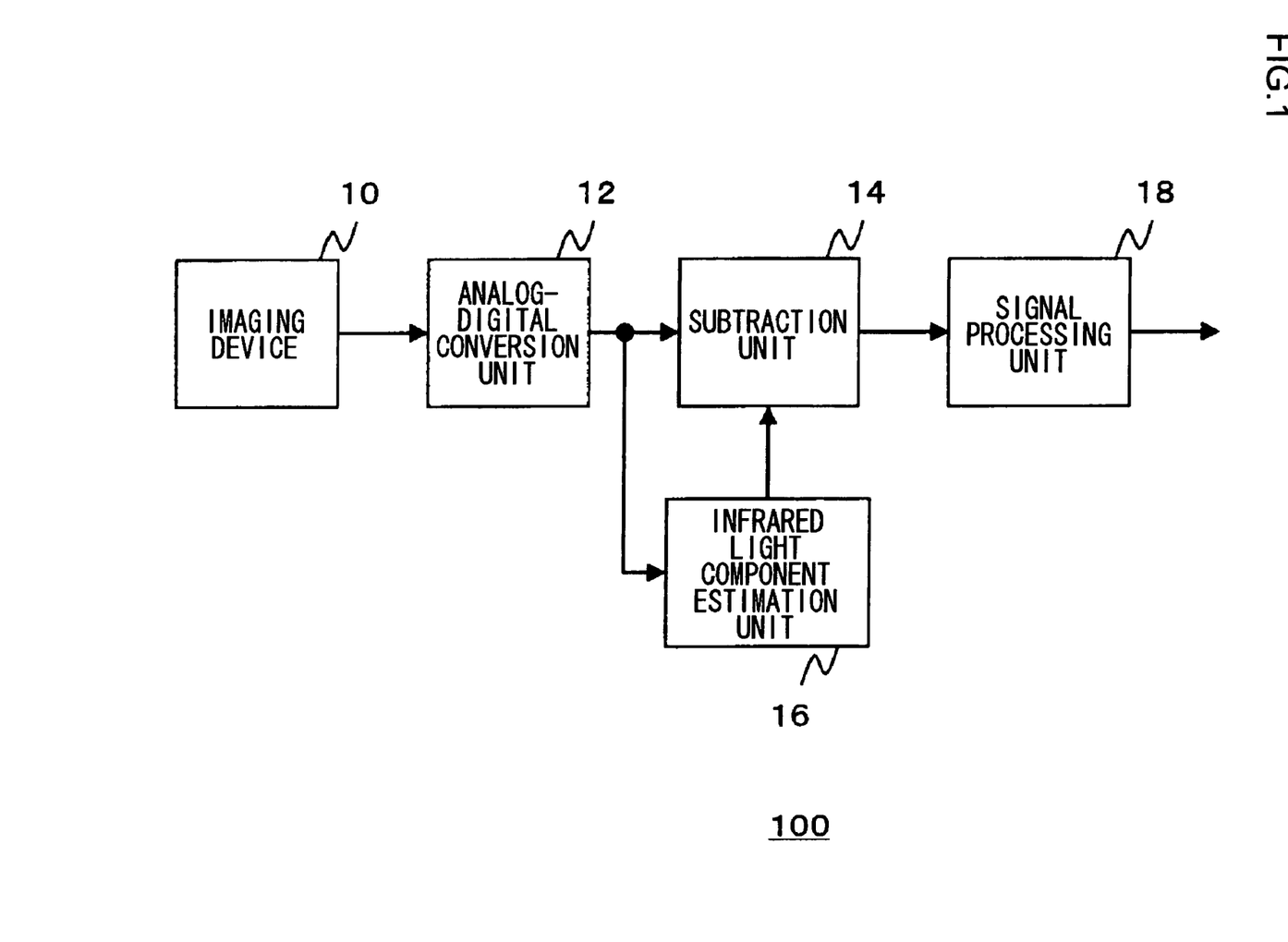
FIG. 1 is a configuration diagram of an imaging apparatus according to a first embodiment of the present invention.

FIG. 1 is a diagram illustrating the configuration of an imaging apparatus 100 according to a first embodiment of the present invention. This configuration can be realized, in terms of hardware, by a CPU, a memory, or another LSI of a computer, or, in terms of software, by a program loaded into memory or the like. However, FIG. 1 illustrates the function blocks realized by cooperation between hardware and software with respect to the first embodiment of the present invention. Therefore, it will be understood by a person skilled in the art that these function blocks can be realized in various forms by using hardware only, software only, or by using a combination thereof.

The imaging apparatus 100 includes an imaging device 10, an analog-digital conversion unit 12, a subtraction unit 14, an infrared light component estimation unit 16, and a signal processing unit 18. Light from a subject is incident on the imaging device 10.

The imaging device 10 is composed of, for example, CCDs or CMOS sensors and is provided with photodiodes arranged in a matrix form. Furthermore, a pixel is formed from the photodiodes.

In addition to this, the imaging device 10 is provided with filters of different colors, and each of the color filters is provided for each of the pixels. Color is separated through the color filters. The color filters provided in the imaging device 10 include visible light filters, which pass visible light and infrared light, and an infrared light filter, which mainly passes infrared light. Furthermore, the visible light filters are classified into a red filter, a green filter, and a blue filter, each of which passes the corresponding color.

Figure 2:
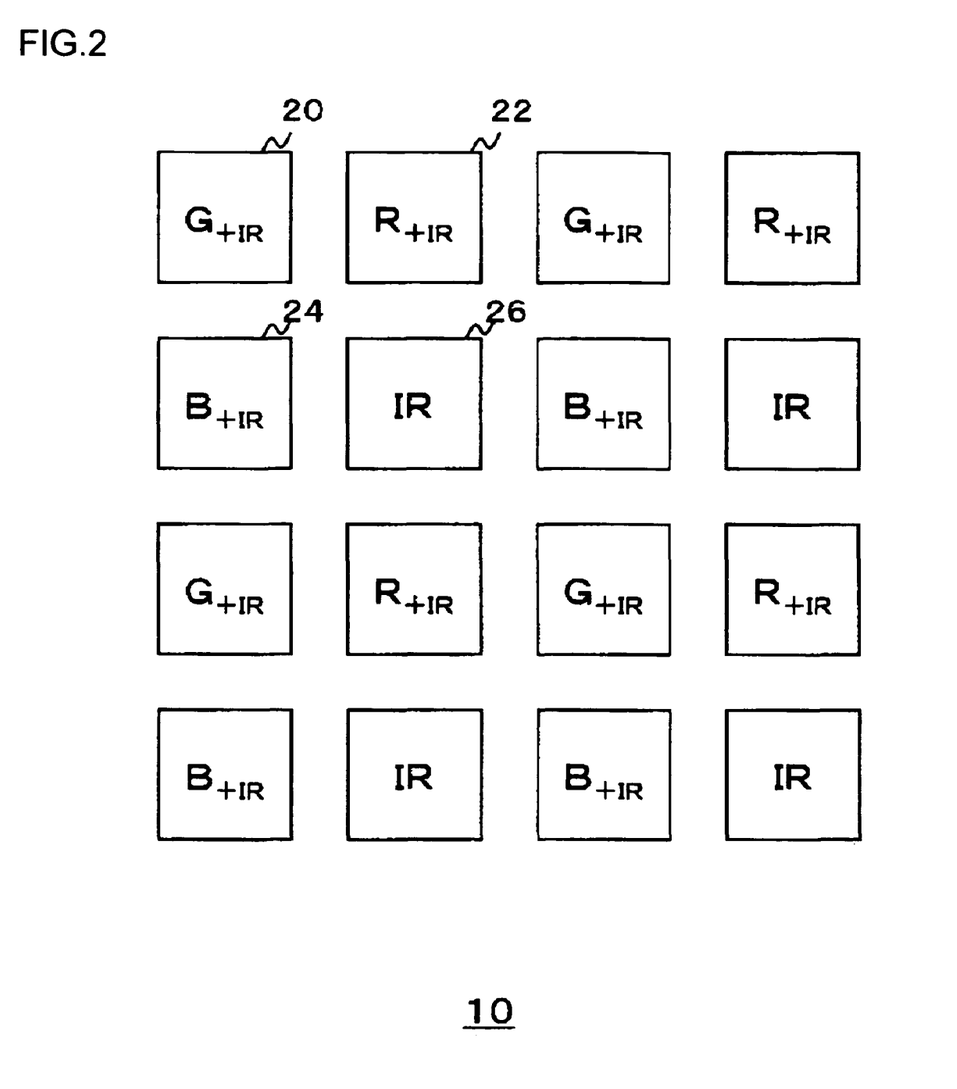
FIG. 2 is a diagram illustrating the arrangement of color filters of an imaging device of FIG. 1.

FIG. 2 is a diagram illustrating the arrangement of the color filters provided in the imaging device 10. The green filter passing green light is disposed on a pixel 20 of the imaging device 10, and the red filter passing red light is disposed on a pixel 22. The blue filter passing blue light is disposed on a pixel 24. Each of these green, red, and blue filters also has the characteristic of passing infrared light. In addition to this, the infrared light filter mainly passing infrared light is disposed on a pixel 26. These green, red, blue, and infrared light filters are arranged as a unit having dimensions of two vertical pixels by two lateral pixels, and the unit is repeated.

The imaging device 10 converts the light passing through each of the color filters provided for the respective pixels into an electrical signal according to the intensity of the light, and the electrical signal for each of the pixels is outputted in turn as an image signal. Specifically, the image signal outputted from the pixel 20 has a magnitude corresponding to the sum of the magnitudes of the green light and infrared light components, and the image signal outputted from the pixel 22 has a magnitude corresponding to the sum of the magnitudes of the red light and infrared light components. The image signal outputted from the pixel 24 has a magnitude corresponding to the sum of the magnitudes of the blue light and infrared light components. The image signal outputted from the pixel 26 has a magnitude corresponding to the magnitude of the infrared light component.

The analog-digital conversion unit 12 converts the image signal outputted from the imaging device 10 into, for example, a digital signal of ten bits. The converted digital signal is inputted to the subtraction unit 14 and the infrared light component estimation unit 16.

In the subtraction unit 14, an infrared light component IR outputted from the pixel 26 and serving as the image signal is removed from the image signals outputted from the pixels 20, 22, and 24 of the imaging device 10, i.e., from the sum of the green light and infrared light components ($G_{+IR}$), the sum of the red light and infrared light components ($R_{+IR}$), and the sum of the blue light and infrared light components ($B_{+IR}$). In this case, the infrared light component IR outputted from the pixel 26 is not directly subtracted. Specifically, in the infrared light component estimation unit 16, the infrared light component IR is corrected independently for each of the sum of the green and infrared light components ($G_{+IR}$), the sum of the red and infrared light components ($R_{+IR}$), and the sum of the blue and infrared light components ($B_{+IR}$). Then, the corrected infrared light component IR is used for the subtraction.

In the infrared light component estimation unit 16, the infrared light component IR outputted from the pixel 26 is corrected based on the spectral characteristics of the light received by each of the pixels of the imaging device 10, and as such the infrared light component superposed on each of the color components $G_{+IR}$, $R_{+IR}$, and $B_{+IR}$ is estimated. For example, the ratio of the spectral characteristics in the infrared region of the light received by the pixel 20 to the spectral characteristics of the light received by the pixel 26 is determined. Then, the infrared light component IR serving as the output image signal of the pixel 26 is multiplied by this ratio to thereby estimate the infrared light component superposed on the color component $G_{+IR}$.

Similarly, in the infrared light component estimation unit 16, the ratio of the spectral characteristics in the infrared region of the light received by the pixel 22 to the spectral characteristics the light received by the pixel 26 is determined. Then, the infrared light component IR is multiplied by this ratio to thereby estimate the infrared light component superposed on the color component $R_{+IR}$. In addition to this, the ratio of the spectral characteristics in the infrared region of the light received by the pixel 24 to the spectral characteristics of the light received by the pixel 26 is determined. Then, the infrared light component IR is multiplied by this ratio to thereby estimate the infrared light component superposed on the color component $B_{+IR}$.

The spectral characteristics of the light received by each of the pixels are determined by the spectral characteristics of the color filter provided for each of the pixels, the spectral characteristics of the photodiode, the spectral characteristics of the light incident on each of the pixels, and the like. The spectral characteristics of the color filter and the spectral characteristics of the photodiode are determined by the shape and processing of each of the pixels of the imaging device 10. The spectral characteristics of the photodiode and the color filter of each of the pixels are stored in the infrared light component estimation unit 16. Meanwhile, the spectral characteristics of the light incident on each of the pixels are determined in the infrared light component estimation unit 16 by integrating the image signal outputted from the imaging device 10. Furthermore, the spectral characteristics of the received light may be determined by means of a control apparatus (not shown).

The infrared light component estimation unit 16 transmits the estimated magnitude of the infrared light component to the subtraction unit 14. In the subtraction unit 14, the infrared light component is removed from each of the color components $G_{+IR}$, $R_{+IR}$, and $B_{+IR}$ using the infrared light component transmitted from the infrared light component estimation unit 16 and corrected for each of the color components.

In the signal processing unit 18, a luminous signal and a color signal are extracted from the signal outputted from the subtraction unit 14, and the signal outputted from the subtraction unit 14 is also subjected to various kinds of image processing. The signal obtained in the signal processing unit 18 is sent to a display apparatus (not shown), an image compression apparatus (not shown), and the like.

Hereinafter, the operation of the imaging apparatus 100 shown in FIG. 1 will be described based on the configuration described above. The light inputted into the imaging device 10 is separated into the sum of the green and infrared light components ($G_{+IR}$), the sum of the red and infrared light components ($R_{+IR}$), the sum of the blue and infrared light components ($B_{+IR}$), and the infrared component IR by means of the color filters provided for the respective pixels as shown in FIG. 2. Then, each of the separated light components is converted into an electrical signal. The electrical signal for each of the pixels is outputted from the imaging device 10 as an image signal and is converted into a digital signal by means of the analog-digital conversion unit 12.

The image signal converted into the digital signal in the analog-digital conversion unit 12 is inputted to the subtraction unit 14 and the infrared light component estimation unit 16. In the infrared light component estimation unit 16, the infrared light component IR outputted from the pixel provided with the infrared light filter is multiplied by the ratio of the spectral characteristics in the infrared region of the light received by each of the pixels provided with the respective green, red, and blue filters to the spectral characteristics of the light received by the pixel provided with the infrared light filter. In this manner, the magnitudes of the infrared light components which are contained in the sum of the green and infrared light components ($G_{+IR}$), the sum of the red and infrared light components ($R_{+IR}$), and the sum of the blue and infrared light components ($B_{+IR}$) are separately estimated.

The magnitudes of the infrared light components superposed on the respective color components, the magnitudes being estimated in the infrared light component estimation unit 16, are transmitted to the subtraction unit 14. In the subtraction unit 14, the infrared light components separately estimated are subtracted from the sum of the green and infrared light components ($G_{+IR}$), the sum of the red and infrared light components ($R_{+IR}$), and the sum of the blue and infrared light components ($B_{+IR}$), respectively.

The processing described above will now be described in greater detail.

The infrared light component estimation unit 16 determines the value of each of the coefficients ($L_R$, $L_G$, and $L_B$) for adjusting the difference in the spectral characteristics between each of the pixels provided with the respective color filters and the pixel provided with the infrared light filter, and these coefficients are transmitted to the subtraction unit 14. In the subtraction unit 14, the infrared light component IR outputted from the pixel 26 and serving as the image signal is removed from the image signals outputted from the pixels 20, 22, and 24 of the imaging device 10, i.e., from the sum of the green and infrared light components ($G_{+IR}$), the sum of the red and infrared light components ($R_{+IR}$), and the sum of the blue and infrared light components ($B_{+IR}$). In this case, the infrared light component IR outputted from the pixel 26 is not directly subtracted, but the values multiplied by the respective coefficients, ($L_R$, $L_G$, and $L_B$) are subtracted instead. Specifically, the subtraction unit 14 calculates the red light component R, the green light component G, and the blue light component B using the following equations (1) to (3):

$$R = R_{+IR} L_R \times IR, \quad (1)$$

$$G = G_{+IR} - L_G \times IR, \text{ and} \quad (2)$$

$$B = B_{+IR} - L_B \times IR. \quad (3)$$

Figure 3:
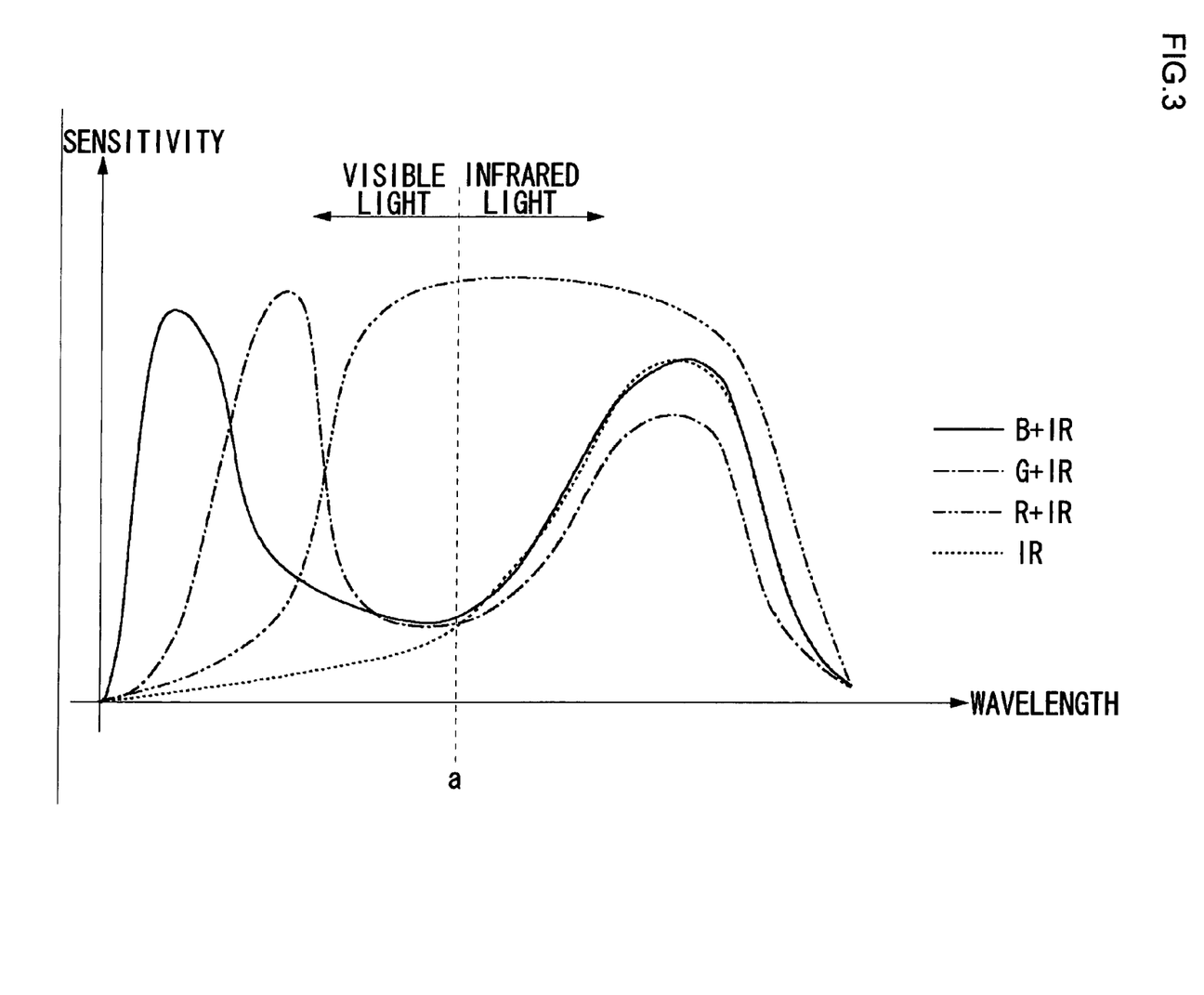
FIG. 3 is a graph showing an example of the spectral characteristics of each of pixels according to the first embodiment of the present invention, each of the pixels being provided with one of a red filter, a green filter, a blue filter, and an infrared light filter.

FIG. 3 is a graph showing an example of the spectral characteristics of each of the pixels provided with the respective red, green, blue, and infrared light filters. In FIG. 3, the horizontal axis represents wavelength, and the vertical axis represents sensitivity. The region in which the wavelength is larger than that at a boundary line a is the infrared region, and the region in which the wavelength is smaller than that at the boundary line a is the visible region.

In the infrared wavelength region, the sensitivity of the pixel provided with the red filter is much larger than the sensitivity of the pixel provided with the infrared light filter. In the characteristic example shown in FIG. 3, the pixel provided with the red filter has a sensitivity approximately 1.5 times that of the pixel provided with the infrared light filter in the infrared wavelength region. Therefore, the value of the coefficient $L_R$ for the pixel provided with the red filter is set to 1.5. The infrared light component cannot be thoroughly removed from the output signal of the pixel provided with the red filter by directly subtracting the infrared light component IR outputted from the pixel provided with the infrared light filter. Therefore, the infrared light component IR outputted from the pixel provided with the infrared light filter is multiplied by the coefficient $L_R$ to correct the component IR, and as such the infrared light component contained in the output signal of the pixel provided with the red filter can be thoroughly removed.

In the infrared wavelength region, the sensitivity of the pixel provided with the blue filter is approximately the same as the sensitivity of the pixel provided with the infrared light filter. Furthermore, in the infrared wavelength region, the sensitivity of the pixel provided with the green filter is approximately 10% smaller than the sensitivity of the pixel provided with the infrared light filter. Therefore, the value of the coefficient $L_B$ for the pixel provided with the blue filter is set to 1, and the value of the coefficient $L_G$ for the pixel provided with the green filter is set to 0.9. Hence, the coefficients $L_R$, $L_G$, and $L_B$ in the imaging device 10 having the characteristic example shown in FIG. 3 are approximately 1.5, 0.9, and 1.0, respectively.

The spectral characteristics described above are affected not only by the spectral characteristics of each of the filters and the spectral characteristics of the photodiode but also by the spectral characteristics of a light source and the spectral characteristics of a subject. These characteristics vary depending on the types of light sources and subjects. In addition, the sensitivity varies depending on the wavelength, and the intensity of light at various wavelengths may be large or small. Therefore, it is desirable that the value of each of the coefficients ($L_R$, $L_G$, and $L_B$) be changed depending on the types of light sources and subjects.

The infrared light component estimation unit 16 may store different values of each of the coefficients ($L_R$, $L_G$, and $L_B$) whose values have been calculated for different types of light sources in advance. For example, different values of each of the coefficients ($L_R$, $L_G$, and $L_B$) are stored for sunlight, fluorescent light, and incandescent light. These values are determined by a designer by means of experiments or simulations. When a user selects a desired light source mode, values of the coefficients ($L_R$, $L_G$, and $L_B$) corresponding to the selected mode are employed in the infrared light component estimation unit 16.

Furthermore, the infrared light component estimation unit 16 may store different values of each of the coefficients ($L_R$, $L_G$, and $L_B$) whose values have been calculated for different types of subjects in advance. For example, different values of each of the coefficients ($L_R$, $L_G$, and $L_B$) are stored for humans, plants, and buildings. When a user selects a desired subject mode, values of the coefficients ($L_R$, $L_G$, and $L_B$) corresponding to the selected mode are employed in the infrared light component estimation unit 16. Also, different values of each of the coefficients ($L_R$, $L_G$, and $L_B$) may be stored for different combinations of the light source and the subject.

It should be appreciated that the coefficients ($L_R$, $L_G$, and $L_B$) corresponding to the spectral characteristics of light sources and subjects may not be registered in the infrared light component estimation unit 16 in advance. In such a case, the coefficients ($L_R$, $L_G$, and $L_B$) may be appropriately calculated each time an image is taken. For example, the infrared light component estimation unit 16 may determine the spectral characteristics of the light incident on each of the pixels by integrating the image signal outputted from the imaging device 10 when an image is taken. Also, a spectral characteristic sensor may be provided in the imaging apparatus 100 to measure the spectral characteristics when an image is taken, thereby determining the coefficients ($L_R$, $L_G$, and $L_B$) at that time.

In the signal processing unit 18, various kinds of image processing are performed based on the output signal of the subtraction unit 14, and the processed signal is outputted to the outside.

In the imaging apparatus according to this embodiment, the infrared light component is subtracted from each of the color components which contain the infrared light component and which are outputted from the respective pixels provided with the respective visible light filters. More specifically, at this time, the infrared light component outputted from the pixel provided with the infrared light filter is multiplied by the ratio of the spectral characteristics in the infrared region of the light received by each of the pixels provided with the respective visible light filters to the spectral characteristics of the light received by the pixel provided with the infrared light filter. In this manner, the infrared light component contained in each of the color components outputted from the respective pixels provided with the respective visible light filters is estimated. The spectral characteristics in the infrared region of the light received by each of the pixels provided with the respective visible light filters may be different from the spectral characteristics of the light received by the pixel provided with the infrared light filter. Even in this case, the infrared light component contained in each of the color components outputted from the respective pixels provided with the respective visible light filters can be estimated relatively accurately. Therefore, the infrared light component can be satisfactorily removed from each of the color components. Hence, according to the imaging apparatus, a color image having good color reproducibility can be obtained.

Hereinabove, the present invention has been described with reference to the first embodiment. However, it should be appreciated that the first embodiment is provided by way of example only. Thus, it will be understood by those skilled in the art that various modifications may be made to the combinations of each component and each process described above and that such modifications fall within the scope of the present invention.

In the first embodiment described above, an example has been shown in which, in the infrared light component estimation unit 16, the infrared light component IR outputted from the pixel provided with the infrared light filter is multiplied by the ratio of the spectral characteristics in the infrared region of the light received by each of the pixels provided with the respective visible light filters to the spectral characteristics of the light received by the pixel provided with the infrared light filter, and as such the infrared light component is corrected. However, for example, the infrared light component may be estimated as follows. The difference between the spectral characteristics in the infrared region of the light received by each of the pixels provided with the respective visible light filters and the spectral characteristics of the light received by the pixel provided with the infrared light filter is considered as an offset amount. Then, this offset amount is added to the infrared light component IR outputted from the pixel provided with the infrared light filter. This method is effective when the infrared light component on which the characteristics of each of the filters are superposed is expressed as an offset amount.

Furthermore, in the first embodiment described above, the infrared light component estimation unit 16 estimates, based on the spectral characteristics in the infrared region of the light received by each of the pixels provided with the respective visible light filters and the spectral characteristics of the light received by the pixel provided with the infrared light filter, the infrared light component contained in the signal outputted from each of the pixels provided with the respective visible light filters. However, the infrared light component contained in the signal outputted from each of the pixels provided with the respective visible light filters may be estimated based not only on the spectral characteristics in the infrared region of the light received by each of the pixels provided with the respective visible light filters but also on the spectral characteristics of a part of light having other wavelengths and the spectral characteristics of the light received by the pixel provided with the infrared light filter. This method is effective when the infrared light filter has the property of passing a part of visible light.

Moreover, in the first embodiment described above, an example has been shown in which the imaging device 10 has the pixels provided with the respective visible filters passing both visible light and infrared light and the pixel provided with the infrared light filter mainly passing infrared light, but the present invention is not limited thereto. An imaging apparatus which has both an imaging device provided with the visible light filters and an imaging device provided with the infrared light filter and in which the image signals outputted from the imaging devices are utilized is considered to fall within the scope of the imaging apparatus of the present invention.

Furthermore, in the first embodiment described above, a description has been given of the imaging device 10 in which the three primary color filters and the infrared light filter are employed. However, this embodiment is also applicable to an imaging device 10 in which complementary color filters and an infrared light filter are employed. The complementary color filters may separate light into yellow (Ye) light, cyan (CY) light, and magenta (Mg) light. Also, the complementary color filters may separate light into yellow (Ye) light, cyan (Cy) light, and green (Gr) light or yellow (Ye) light, cyan (Cy) light, magenta (Mg) light, and green (Gr) light. Each of the filters passing the corresponding color passes an infrared light component as in the three primary color filters described above.

Figure 4:
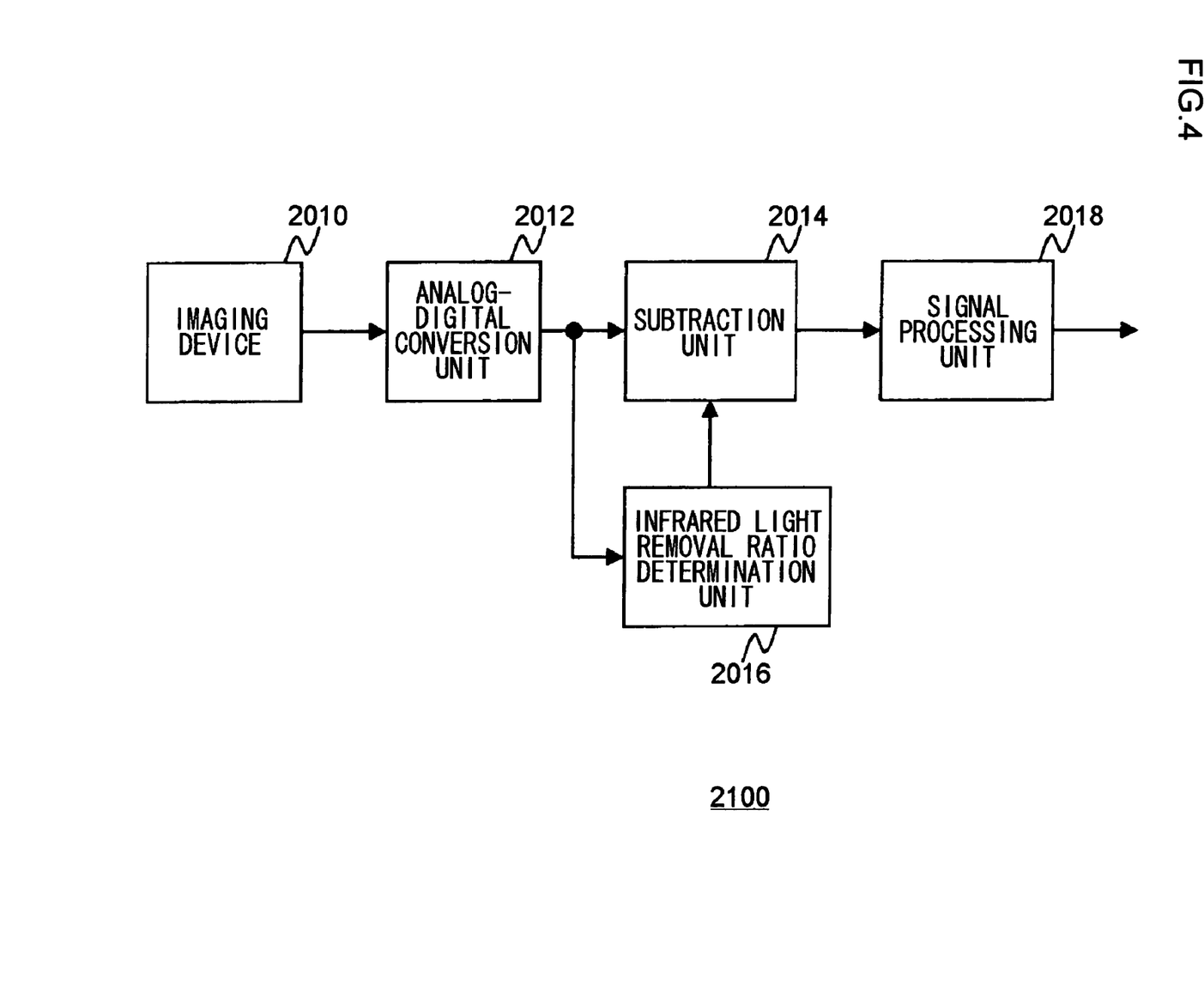
FIG. 4 is a configuration diagram of an imaging apparatus according to a second embodiment of the present invention.

FIG. 4 is a diagram illustrating the configuration of an imaging apparatus 2100 according to a second embodiment of the present invention. This configuration can be realized, in terms of hardware, by a CPU, a memory, or another LSI of a computer, or, in terms of software, by a program loaded into memory or the like. However, the function blocks realized by cooperation between hardware and software with respect to the second embodiment of the present invention. Therefore, it will be understood by a person skilled in the art that the function blocks can be realized in various forms by using hardware only, software only, or by using a combination thereof.

The imaging apparatus 2100 comprises an imaging device 2010, an analog-digital conversion unit 2012, a subtraction unit 2014, an infrared light removal ratio determination unit 2016, and a signal processing unit 2018. Light from a subject is incident on the imaging device 2010.

The imaging device 2010 is composed of, for example, CCDs or CMOS sensors and is provided with photodiodes arranged in a matrix form. Furthermore, a pixel is formed from the photodiodes.

In addition to this, the imaging device 2010 is provided with filters of different colors, and each of the color filters is provided for each of the pixels. Color is separated through the color filters. The color filters provided in the imaging device 2010 include visible light filters, which pass visible light and infrared light, and an infrared light filter, which mainly passes infrared light. Furthermore, the visible light filters are classified into a red filter, a green filter, and a blue filter, each of which passes the corresponding color.

Figure 5:
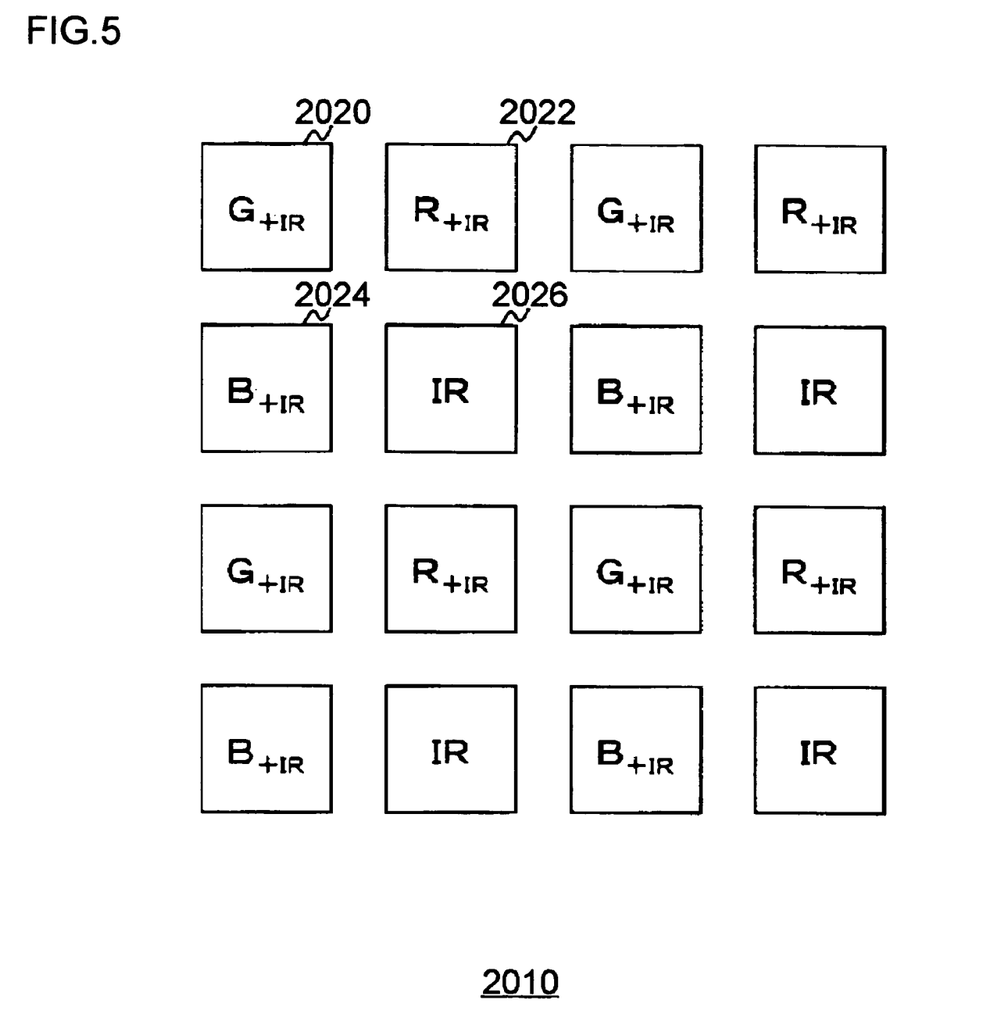
FIG. 5 is a diagram illustrating the arrangement of color filters of an imaging device of FIG. 4.

FIG. 5 is a diagram illustrating the arrangement of the color filters provided in the imaging device 2010. The green filter passing green light is disposed on a pixel 2020 of the imaging device 2010, and the red filter passing red light is disposed on a pixel 2022. The blue filter passing blue light is disposed on a pixel 2024. Each of these green, red, and blue filters also has the characteristic of passing infrared light. In addition to this, the infrared light filter mainly passing infrared light is disposed on a pixel 2026. These green, red, blue, and infrared light filters are arranged as a unit having dimensions of two vertical pixels by two lateral pixels, and the unit is repeated.

The imaging device 2010 converts the light passing through each of the color filters provided for the respective pixels into an electrical signal according to the intensity of the light, and the electrical signal for each of the pixels is outputted in turn as an image signal. Specifically, the image signal outputted from the pixel 2020 has a magnitude corresponding to the sum of the magnitudes of the green light and infrared light components, and the image signal outputted from the pixel 2022 has a magnitude corresponding to the sum of the magnitudes of the red light and infrared light components. The image signal outputted from the pixel 2024 has a magnitude corresponding to the sum of the magnitudes of the blue light and infrared light components. The image signal outputted from the pixel 2026 has a magnitude corresponding to the magnitude of the infrared light component.

The analog-digital conversion unit 2012 converts the image signal outputted from the imaging device 2010 into, for example, a digital signal of ten bits. The converted digital signal is inputted to the subtraction unit 2014 and the infrared light removal ratio determination unit 2016.

In the subtraction unit 2014, an infrared light component IR outputted from the pixel 2026 and serving as the image signal is removed from the image signals outputted from the pixels 2020, 2022, and 2024 of the imaging device 2010, i.e., from the sum of the. green and infrared light components. ($G_{+IR}$), the sum of the red and infrared light components ($R_{+IR}$), and the sum of the blue and infrared light components ($B_{+IR}$). In this case, the infrared light component IR outputted from the pixel 2026 is not directly subtracted but is subtracted after the infrared light component IR is multiplied by a coefficient K ($0 \leq K \leq 1$). Specifically, in the subtraction unit 2014, the red light component R, the green light component G, and the blue light component B are calculated using the following equations:

$$R = R_{+IR} - K \times IR, \quad (4)$$

$$G = G_{+IR} - K \times IR, \text{ and} \quad (5)$$

$$B = B_{+IR} - K \times IR. \quad (6)$$

The infrared light removal ratio determination unit 2016 determines the value of the coefficient K to be multiplied by the infrared light component IR when the infrared light component is removed in the subtraction unit 2014. The coefficient K is determined based on the ratio of the infrared light component IR to each of the sum of the red and infrared light components ($R_{+IR}$), the sum of the green and infrared light components ($G_{+IR}$), and the sum of the blue and infrared light components ($B_{+IR}$).

In this case, the coefficient K may be determined as follows: the coefficient K used in equation (4) is determined based on the ratio of the infrared light component IR to the sum of the red and infrared light components ($R_{+IR}$); the coefficient K used in equation (5) is determined based on the ratio of the infrared light component IR to the sum of the green and infrared light components ($G_{+IR}$); and the coefficient K used in equation (6) is determined based on the ratio of the infrared light component IR to the sum of the blue and infrared light components ($B_{+IR}$). Furthermore, the coefficient K used in equations (4) to (6) may be determined based on the ratio of the infrared light component IR to one of the sum of the red and infrared light components ($R_{+IR}$), the sum of the green and infrared light components ($G_{+IR}$), and the sum of the blue and infrared light components ($B_{+IR}$).

The infrared light removal ratio determination unit 2016 sets the value of K to 1 when the ratio of the infrared light component IR is sufficiently small. In this manner, the infrared light component IR can be satisfactorily removed from the sum of the red and infrared light components ($R_{+IR}$), the sum of the green and infrared light components ($G_{+IR}$), and the sum of the blue and infrared light components ($B_{+IR}$). Therefore, a color image having good color reproducibility can be obtained.

On the other hand, when the ratio of the infrared light component IR is sufficiently large, the infrared light removal ratio determination unit 2016 sets the value of K to 0. In this case, since the amount of the visible light component contained in each of the sum of the red and infrared light components ($R_{+IR}$), the sum of the green and infrared light components ($G_{+IR}$), and the sum of the blue and infrared light components ($B_{+IR}$) is approximately 0, the infrared light component is dominant in each of $R_{+IR}$, $G_{+IR}$, and $B_{+IR}$. Hence, when the values of R, G, and B are determined using equations (4) to (6) in the subtraction unit 2014 with the value of K set to 0, these determined values can be roughly considered as the magnitude of the infrared light component. In this manner, a high-sensitivity monochrome image in which the magnitude of the infrared light component is effectively utilized can be obtained. In this instance, the relationship between the various ratios described above and the coefficient K to be set is determined by a designer by means of experiments or simulations.

Moreover, when the ratio of the infrared light component IR is not sufficiently large but is relatively large, the value of K is set so as to approach from 1 to 0 as the ratio increases. In this manner, switching between a color image and a monochrome image can be performed smoothly.

In the signal processing unit 2018, a luminous signal and a color signal are extracted from the signal outputted from the subtraction unit 2014, and the signal outputted from the subtraction unit 2014 is also subjected to various kinds of image processing. The signal obtained in the signal processing unit 2018 is sent to a display apparatus (not shown), an image compression apparatus (not shown), and the like.

Hereinafter, the operation of the imaging apparatus 2100 shown in FIG. 4 is described based on the configuration described above. The light inputted into the imaging device 2010 is separated into the sum of the red and infrared light components ($R_{+IR}$), the sum of the green and infrared light components ($G_{+IR}$), the sum of the blue and infrared light components ($B_{+IR}$), and the infrared component IR by means of the color filters provided for the respective pixels as shown in FIG. 5. Then, each of the separated light components is converted into an electrical signal. The electrical signal for each of the pixels is outputted from the imaging device 2010 as an image signal and is converted into a digital signal by means of the analog-digital conversion unit 2012.

The image signal converted into a digital signal in the analog-digital conversion unit 2012 is inputted to the subtraction unit 2014 and the infrared light removal ratio determination unit 2016. The infrared light removal ratio determination unit 2016 determines the coefficient K in each of equations (4) to (6) based on the ratio of the infrared light component IR to each of the sum of the red and infrared light components ($R_{+IR}$), the sum of the green and infrared light components ($G_{+IR}$), and the sum of the blue and infrared light components ($B_{+IR}$) Specifically, when the ratio of the infrared light component IR is sufficiently small, the value of K is set to 1. Furthermore, the value of K is set so as to approach from 1 to 0 as the ratio of the infrared light component IR increases. When the ratio of the infrared light component IR is sufficiently large, the value of K is set to 0.

The values of K set in the infrared light removal ratio determination unit 2016 are transmitted to the subtraction unit 2014. In the subtraction unit 2014, the value obtained by multiplying the infrared light component IR by the coefficient K is subtracted from each of the sum of the red and infrared light components ($R_{+IR}$), the sum of the green and infrared light components ($G_{+IR}$), and the sum of the blue and infrared light components ($B_{+IR}$), according to equations (4) to (6).

In the signal processing unit 2018, various kinds of image processing are performed based on the output signal of the subtraction unit 2014, and the processed signal is outputted to the outside.

In the imaging apparatus according to the present embodiment, the infrared light component is subtracted from each of the image signals containing the visible light and infrared components taken by the imaging device. More specifically, at this time, the subtraction ratio of the infrared light component is determined based on the ratio of the magnitude of the infrared light component to the magnitude of each of the image signals containing the visible light and infrared light components. When the ratio of the infrared light component is sufficiently small, the infrared light component is directly subtracted. As the ratio of the infrared light component increases, the subtraction ratio of the infrared light component is gradually decreased. When the ratio of the infrared light component is sufficiently large, the infrared light component is not subtracted. In this manner, the infrared light component can be reliably removed when the ratio of the infrared light component is sufficiently small, and thus a color image having good color reproducibility can be obtained. Furthermore, when the ratio of the infrared light component is sufficiently large, a high-sensitivity monochrome image can be obtained by utilizing the infrared light component contained in the signal from each of the pixels. In addition to this, since the subtraction ratio of the infrared light component is gradually changed according to the magnitude of the infrared light component, switching between a color image and a monochrome image can be performed smoothly.

Hereinabove, the present invention has been described with reference to the second embodiment. However, it should be appreciated that the second embodiment is provided by way of example only. Thus, it will be understood by those skilled in the art that various modifications may be made to the combinations of each component and each process described above and that such modifications are intended to fall within the scope of the present invention.

Figure 6:
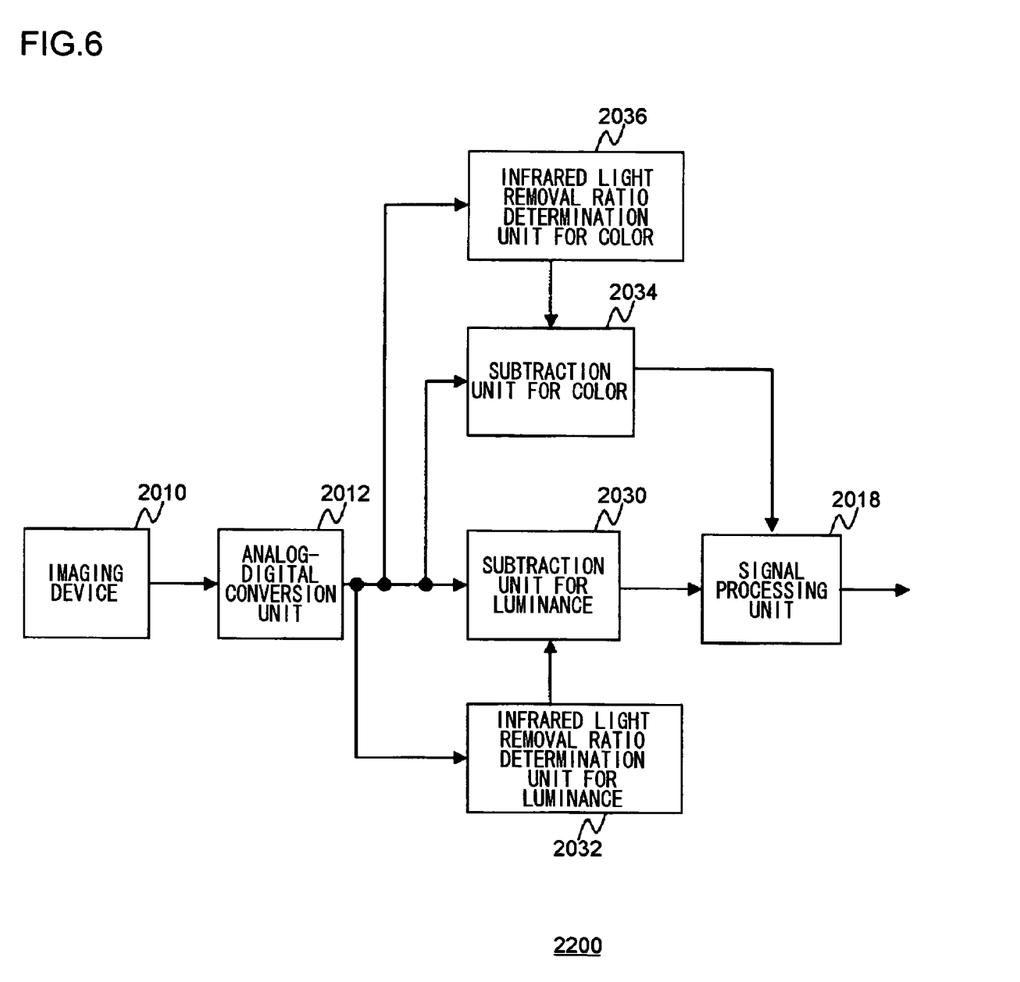
FIG. 6 is a configuration diagram of an imaging apparatus according to a first modified example of the second embodiment of the present invention.

For example, the infrared light component may be removed independently from a luminance component and a color component. FIG. 6 is a diagram illustrating the configuration of an imaging apparatus 2200 according to a first modified example of the second embodiment of the present invention. This imaging apparatus 2200 includes a subtraction unit 2030 for luminance, an infrared light removal ratio determination unit 2032 for luminance, a subtraction unit 2034 for color, and an infrared light removal ratio determination unit 2036 for color, in place of the subtraction unit 2014 and the infrared light removal ratio determination unit 2016 of the imaging apparatus 2100 shown in FIG. 4. Hence, as for the luminance component, the infrared light component passing through each of the visible light filters can be effectively utilized by setting the coefficient K to be a small value, and as such the sensitivity can be increased. As for the color component, the infrared light component can be removed as much as possible by setting the coefficient K to a large value, and as such good color reproducibility can be achieved.

In the second embodiment described above, the ratio of the infrared light component to be removed (i.e., the value of the coefficient K) is determined based on the ratio of the infrared light component passing through the infrared light filter to the sum of the visible and infrared light components passing through each of the visible light filters. However, the illuminance when an image is taken may be taken into account. For example, when an image is taken in a bright environment, the value of K is increased even when the ratio of the infrared light component is large, and as such a large portion of the infrared light component is removed. In this manner the color reproducibility can be improved. In this case, the illuminance when an image is taken may be obtained by the length of the exposure time of the imaging device 2010 or by providing an illuminance sensor to measure the illuminance.

Moreover, in the second embodiment described above, an example has been shown in which the imaging device 2010 has the pixels provided with the respective visible filters passing both visible light and infrared light and the pixel provided with the infrared light filter mainly passing infrared light, but the present invention is not limited thereto. An imaging apparatus which has both an imaging device provided with the visible light filters and an imaging device provided with the infrared light filter and in which the image signals outputted from the imaging devices are utilized is considered to fall within the scope of the imaging apparatus of the present invention.

Figure 7:
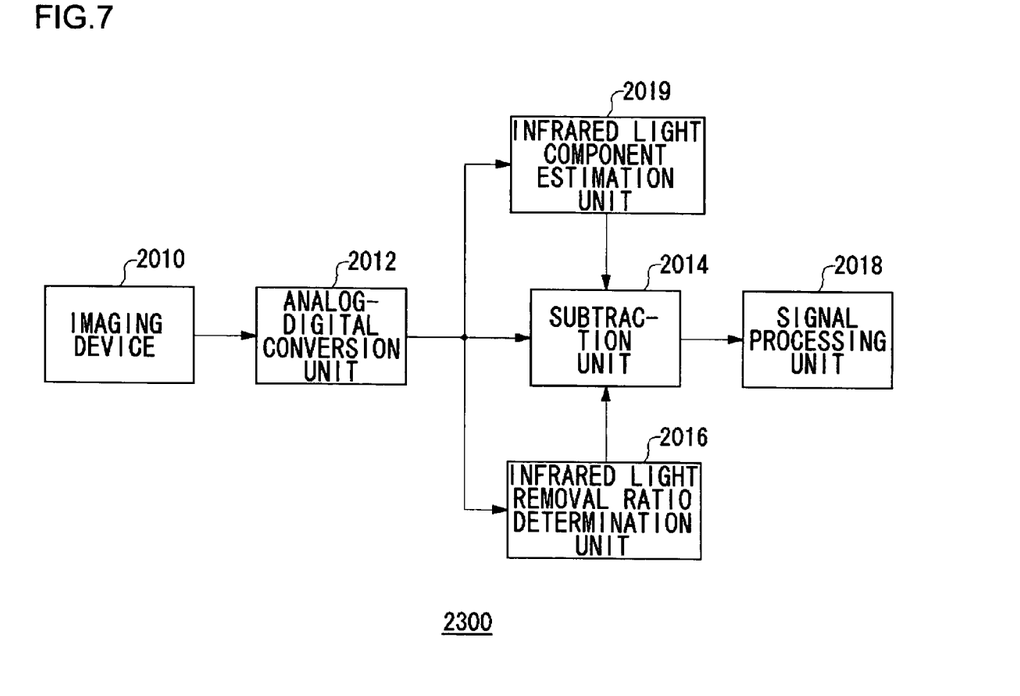
FIG. 7 is a configuration diagram of an imaging apparatus according to a modified example 2 of the second embodiment of the present invention.

In the second embodiment described above, when the ratio of the infrared light component to be removed is determined, the spectral characteristics of the light received by each of the pixels of the imaging device 2010 are not taken into account. However, in a second modified example, the value of the coefficient to be multiplied by the infrared light component to be subtracted from each of the color components on which the infrared light component is superposed is adjusted for each color by referring to the spectral characteristics of the light received by each of the pixels. FIG. 7 is a diagram illustrating the configuration of an imaging apparatus 2300 according to the second modified example of the second embodiment of the present invention. This imaging apparatus 2300 has a configuration in which an infrared light component estimation unit 2019 is added to the configuration of the imaging apparatus 2100 shown in FIG. 4. In this instance, a determination unit mentioned in the appended claims may be a generic concept of the infrared light removal ratio determination unit 2016 and the infrared light component estimation unit 2019.

The infrared light component estimation unit 2019 estimates the infrared light component superposed on the signal obtained from the light passing through each of the color filters. Specifically, the amount of the infrared light component superposed on each of the sum of the red and infrared light components ($R_{+IR}$), the sum of the green and infrared light components ($G_{+IR}$), and the sum of the blue and infrared light components ($B_{+IR}$) described above is estimated. At this time, the difference in spectral characteristics between the pixel 2026 provided with the infrared light filter and the pixels 2020, 2022, and 2024 provided with the respective color filters is taken into account.

The spectral characteristics of the light received by each of the pixels are determined by the spectral characteristics of the filter provided in each of the pixels, the spectral characteristics of the photodiode, the spectral characteristics of the light incident on each of the pixels, and the like. The spectral characteristics of the color filter and the spectral characteristics of the photodiode are determined by the shape and processing of each of the pixels of the imaging device 2010. In particular, the spectral characteristics of the infrared light component of each of the color filters are not the same as the spectral characteristics of the infrared light filter. Therefore, when the infrared light component is subtracted from each of the color components on which the infrared light component is superposed, the value of the coefficient to be multiplied by the infrared light component is changed for each color, and as such the color reproducibility is improved.

The infrared light component estimation unit 2019 determines the values of second coefficients ($L_R$, $L_G$, and $L_B$) for adjusting the difference in spectral characteristics between the pixels provided with the respective color filters and the pixel provided with the infrared light filter, and the values of the second coefficients ($L_R$, $L_G$, and $L_B$) are transmitted to the subtraction unit 2014. In the subtraction unit 2014, the infrared light component IR outputted from the pixel 2026 and serving as the image signal is removed from the image signals outputted from the pixels 2020, 2022, and 2024 of the imaging device 2010, i.e., from the sum of the green and infrared light components ($G_{+IR}$), the sum of the red and infrared light components ($R_{+IR}$), and the sum of the blue and infrared light components ($B_{+IR}$). In this case, the infrared light component IR outputted from the pixel 2026 is not directly subtracted but is subtracted after the infrared light component IR is multiplied by a first coefficient K ($0 \leq K \leq 1$) and the second coefficients ($L_R$, $L_G$, and $L_B$). Specifically, in the subtraction unit 2014, the red light component R, the green light component G, and the blue light component B are calculated using the following equations (7) to (9):

$$R = R_{+IR} - K \times L_R \times IR, \tag{7}$$

$$G = G_{+IR} - K \times L_G \times IR, \text{ and} \tag{8}$$

$$B = B_{+IR} - K \times L_B \times IR. \tag{9}$$

In this instance, the first coefficient K is a coefficient based on the ratio of the infrared light component IR to each of the visible light components on which the infrared light component is superposed, the ratio being determined by the infrared light removal ratio determination unit 2016. The second coefficients ($L_R$, $L_G$, and $L_B$) are coefficients based on the ratio of the spectral characteristics in the infrared region of the light received by each of the pixels provided with the respective color filters to the spectral characteristics of the light received by the pixel provided with the infrared light filter, the ratio being determined by the infrared light component estimation unit 2019.

Figure 8:
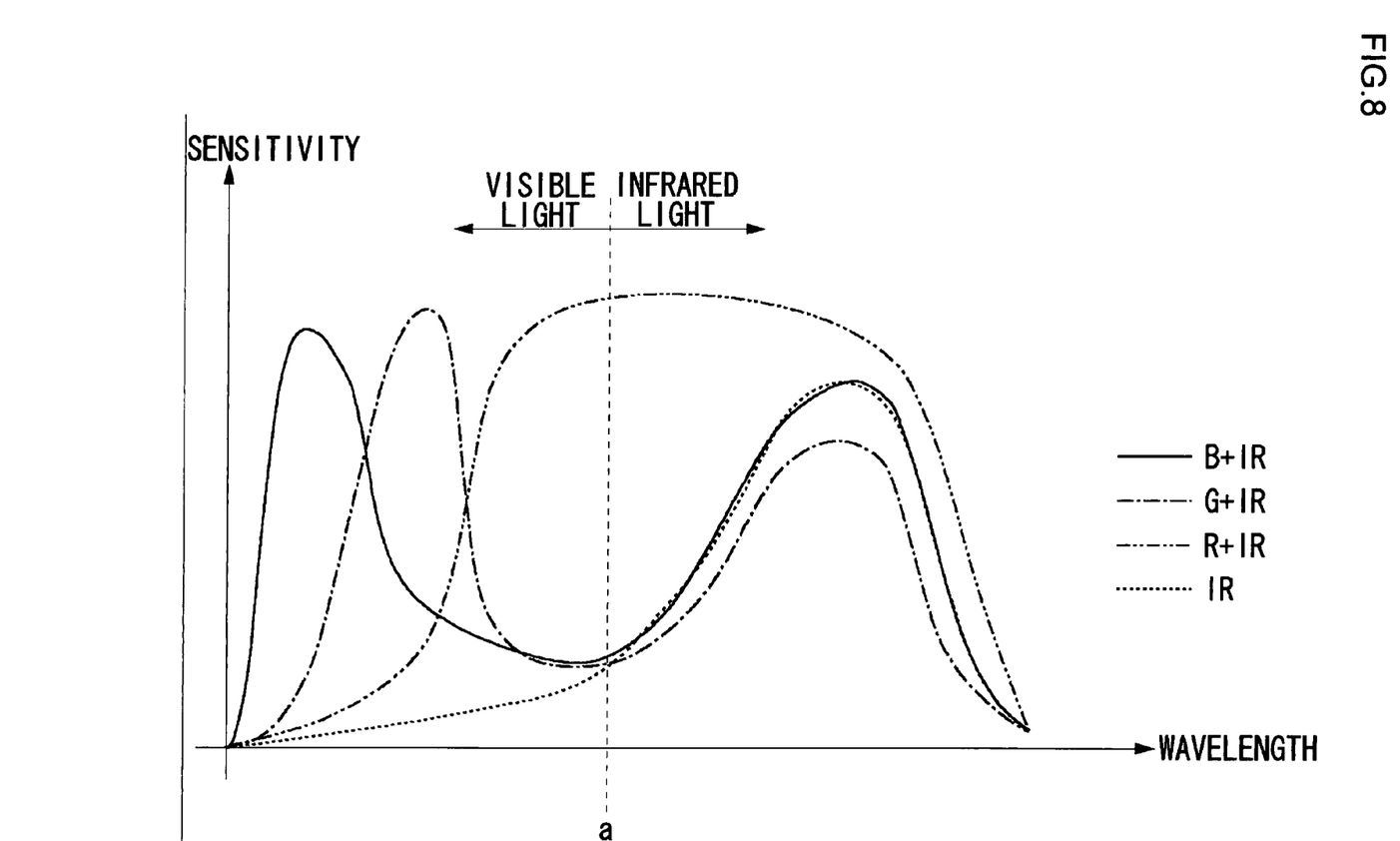
FIG. 8 is a graph showing an example of the spectral characteristics of each of pixels according to the second embodiment of the present invention, each of the pixels being provided with one of a red filter, a green filter, a blue filter, and an infrared light filter.

FIG. 8 is a graph showing an example of the spectral characteristics of each of the pixels provided with the red, green, blue, and infrared light filters, respectively. In FIG. 8, the horizontal axis represents wavelength, and the vertical axis represents sensitivity. The region in which the wavelength is larger than that at a boundary line a is the infrared region, and the region in which the wavelength is smaller than that at the boundary line a is the visible region.

In the infrared wavelength region, the sensitivity of the pixel provided with the red filter is much larger than the sensitivity of the pixel provided with the infrared light filter. In the characteristic example shown in FIG. 8, the pixel provided with the red filter has a sensitivity approximately 1.5 times that of the pixel provided with the infrared light filter in the infrared wavelength region. Therefore, the value of the second coefficient $L_R$ for the pixel provided with the red filter is set to 1.5. When the first coefficient K is 1 (i.e., the infrared light component is to be thoroughly removed), the infrared light component cannot be thoroughly removed from the output signal of the pixel provided with the red filter by directly subtracting the infrared light component IR outputted from the pixel provided with the infrared light filter. Therefore, the infrared light component IR outputted from the pixel provided with the infrared light filter is multiplied by the second coefficient $L_R$ to correct the component IR, and as such the infrared light component contained in the output signal of the pixel provided with the red filter can be thoroughly removed.

In the infrared wavelength region, the sensitivity of the pixel provided with the blue filter is approximately the same as the sensitivity of the pixel provided with the infrared light filter. Furthermore, in the infrared wavelength region, the sensitivity of the pixel provided with the green filter is approximately 10% smaller than the sensitivity of the pixel provided with the infrared light filter. Therefore, the value of the second coefficient $L_B$ for the pixel provided with the blue filter is set to 1, and the value of the second coefficient $L_G$ for the pixel provided with the green filter is set to 0.9. Hence, the second coefficients $L_R$, $L_G$, and $L_B$ in the imaging device 2010 having the characteristic example shown in FIG. 8 are approximately 1.5, 0.9, and 1.0, respectively.

The spectral characteristics described above are affected not only by the spectral characteristics of each of the filters and the spectral characteristics of the photodiode but also by the spectral characteristics of a light source and the spectral characteristics of a subject. These characteristics vary depending on the types of light sources and subjects. In addition, the sensitivity varies depending on the wavelength, and the intensity of light at various wavelengths may be large or small. Therefore, it is desirable that the value of each of the second coefficients ($L_R$, $L_G$, and $L_B$) be changed depending on the types of light sources and subjects.

The infrared light component estimation unit 2019 may store different values of each of the second coefficients ($L_R$, $L_G$, and $L_B$) whose values have been calculated for different types of light sources in advance. For example, different values of each of the second coefficients ($L_R$, $L_G$, and $L_B$) are stored for sunlight, fluorescent light, and incandescent light. These values are determined by a designer by means of experiments or simulations. When a user selects a desired light source mode, values of the second coefficients ($L_R$, $L_G$, and $L_B$) corresponding to the selected mode are employed in the infrared light component estimation unit 2019.

Furthermore, the infrared light component estimation unit 2019 may store different values of each of the second coefficients ($L_R$, $L_G$, and $L_B$) whose values have been calculated for different types of subjects in advance. For example, different values of each of the second coefficients ($L_R$, $L_G$, and $L_B$) are stored for humans, plants, and buildings. When a user selects a desired subject mode, values of the second coefficients ($L_R$, $L_G$, and $L_B$) corresponding to the selected mode are employed in the infrared light component estimation unit 2019. Also, different values of each of the second coefficients ($L_R$, $L_G$, and $L_B$) may be stored for different combinations of the light source and the subject.

It should be appreciated that the second coefficients ($L_R$, $L_G$, and $L_B$) corresponding to the spectral characteristics of light sources and subjects may not be registered in the infrared light component estimation unit 2019 in advance. In such a case, the second coefficients ($L_R$, $L_G$, and $L_B$) may be appropriately calculated each time an image is taken. For example, the infrared light component estimation unit 2019 may determine the spectral characteristics of the light incident on each of the pixels by integrating the image signal outputted from the imaging device 2010 when an image is taken. Also, a spectral characteristic sensor may be provided in the imaging apparatus 2300 to measure the spectral characteristics when an image is taken, thereby determining the second coefficients ($L_R$, $L_G$, and $L_B$) at that time.

In the second modified example, while the difference in spectral characteristics between each of the pixels provided with the respective color filters and the pixel provided with the infrared light filter is adjusted, the infrared light component is removed from each of the color components on which the infrared light component is superposed. In this manner, the infrared light component superposed on each of the color components can be correctly estimated, and the color reproducibility can be further improved. In addition to this, the color balance can be maintained.

Furthermore, in the second embodiment described above, a description has been given of the imaging device 2010 in which the three primary color filters and the infrared light filter are employed. However, this embodiment is applicable to an imaging device 2010 in which complementary color filters and an infrared light filter are employed. The complementary color filters may separate light into yellow (Ye) light, cyan (Cy) light, and magenta (Mg) light. Also, the complementary color filters may separate light into yellow (Ye) light, cyan (Cy) light, and green (Gr) light or yellow (Ye) light, cyan (Cy) light, magenta (Mg) light, and green (Gr) light. Each of the filters passing the corresponding color passes the infrared light component as in the three primary color filters described above.

What is claimed is:

1. An imaging apparatus, comprising:
   a first pixel which receives both visible light and infrared light;
   a second pixel which receives infrared light;
   a subtraction unit which subtracts from a signal outputted from the first pixel a signal obtained by multiplying a signal outputted from the second pixel by a coefficient K, where $0 \leq K \leq 1$; and
   a determination unit which variably controls, based on a ratio of a magnitude of the signal outputted from the second pixel to a magnitude of the signal outputted from the first pixel, the value of the coefficient K to be multiplied by the signal outputted from the second pixel in the subtraction unit between 0 and 1.

2. The imaging apparatus according to claim 1, wherein the determination unit sets the value of the coefficient K to be multiplied by the signal outputted from the second pixel such that the higher the illuminance when an image is taken, the higher the value.

3. The imaging apparatus according to claim 1, wherein the subtraction unit separately subtracts the signals obtained by multiplying the signal outputted from the second pixel by the coefficient K for a luminance component and by the coefficient K for a color component, from the signal outputted from the first pixel, and
   the determination unit sets the value of the coefficient K for a luminance component to be lower than the value of the coefficient K for a color component.

4. The imaging apparatus according to claim 2, wherein the subtraction unit separately subtracts the signals obtained by multiplying the signal outputted from the second pixel by the coefficient K for a luminance component and by the coefficient K for a color component, from the signal outputted from the first pixel, and
   the determination unit sets the value of the coefficient K for a luminance component to be lower than the value of the coefficient K for a color component.

5. The imaging apparatus according to claim 1, wherein the first pixel and the second pixel are formed on an identical imaging device.

6. The imaging apparatus according to claim 2, wherein the first pixel and the second pixel are formed on an identical imaging device.

7. The imaging apparatus according to claim 3, wherein the first pixel and the second pixel are formed on an identical imaging device.

8. The imaging apparatus according to claim 4, wherein the first pixel and the second pixel are formed on an identical imaging device.

9. The imaging apparatus according to claim 1, wherein the determination unit sets the value of the coefficient K such that the higher the ratio of the magnitude of the signal outputted from the second pixel to the magnitude of the signal outputted from the first pixel, the lower the value.

10. The imaging apparatus according to claim 9, wherein the determination sets the value of the coefficient K to 0 when the ratio of the magnitude of the signal outputted from the second pixel to the magnitude of the signal outputted from the first pixel is higher than an higher reference value and sets the value to 1 when the ratio is lower than a lower reference value.

* * * * *